UNITED STATES PATENT OFFICE.

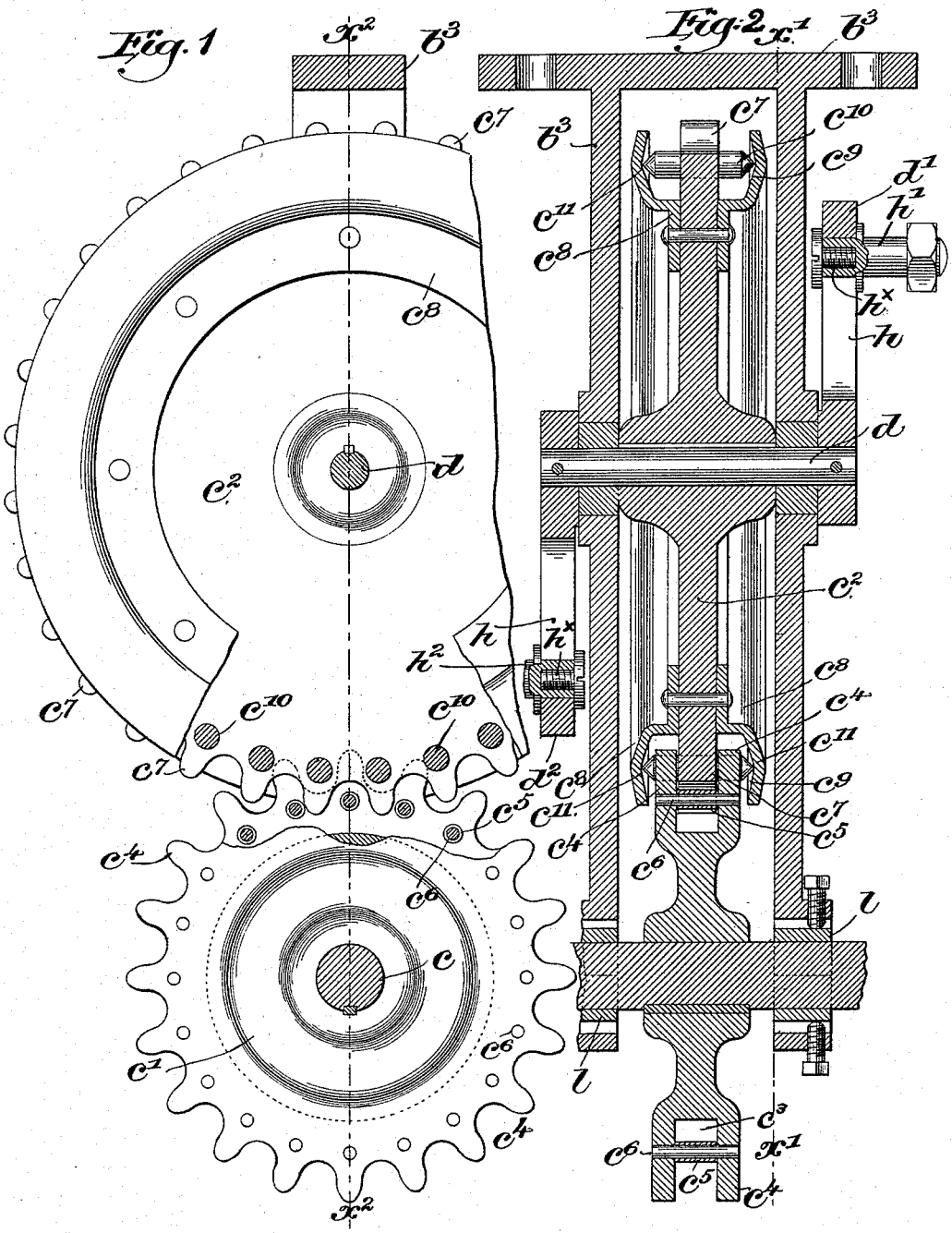

CASIMIR PAUTHONIER, OF BOSTON, MASSACHUSETTS.

POWER-TRANSMITTING OR DRIVING MECHANISM.

SPECIFICATION forming part of Letters Patent No. 527,249, dated October 9, 1894.

Application filed March 9, 1894. Serial No. 503,012. (No model.)

*To all whom it may concern:*

Be it known that I, CASIMIR PAUTHONIER, a citizen of France, now residing in Boston, county of Suffolk, State of Massachusetts, have invented an Improvement in Power-Transmitting or Driving Mechanism, of which the following description, in connection with the accompanying drawings, is a specification, like letters on the drawings representing like parts.

This invention has for its object the production of mechanism for transmitting or applying power most advantageously and with the least friction.

Accordingly, the invention consists in a driving or transmitting mechanism comprising various details of construction, as hereinafter more specifically described and particularly pointed out in the claims.

In the accompanying drawings, illustrating my invention, in the two figures of which like parts are similarly designated, Figure 1 is a sectional elevation taken in the plane of line $x'$—$x'$, Fig. 2, and looking toward the left; and Fig. 2 is a vertical section taken in the plane of line $x^2$—$x^2$ of Fig. 1.

$c$ may represent a main shaft, which may be mounted in suitable bearings $l$, which may be supported in the lower ends of a bracket $b^3$, or other suitable frame. Upon this shaft is keyed a gear wheel $c'$.

$d$ is a shaft, also shown as having bearings in the bracket $b^3$, and on this shaft is keyed a gear wheel $c^2$ of larger diameter than the gear wheel $c'$ and in mesh with said gear wheel $c'$, as hereinafter more particularly described.

The body of the gear wheel $c'$ is shown as provided with a peripheral groove $c^3$, the walls of which form two similar series of teeth $c^4$; and a series of friction rolls $c^5$ is supported in the peripheral groove $c^3$ upon transverse pins $c^6$, which extend through the bases of opposite teeth $c^4$ of the two series of teeth, the rolls $c^5$ turning freely upon their pins.

The gear wheel $c^2$ is provided with a series of teeth $c^7$ adapted to enter the groove $c^3$ of the gear wheel $c'$, and engage the friction rolls $c^5$; and annular flanges $c^8$ are securely bolted to opposite faces of the gear wheel $c^2$, the flanges being concaved or dished at their inner sides, as at $c^9$, see Fig. 2, to prevent longitudinal movement of friction rolls $c^{10}$ which are loosely extended through openings at the bases of the teeth $c^7$, said rolls $c^{10}$ being herein shown as projecting beyond the said series of teeth at each side thereof, to engage the two series of teeth $c^4$ of the gear wheel $c'$, the ends of the said friction rolls $c^{10}$ preferably being made conical, as at $c^{11}$, in order to reduce the friction upon the retaining flanges $c^8$.

From the foregoing description, it will be readily understood that the teeth upon one of the gear wheels mesh with or engage the friction rolls of the other gear wheel and vice-versa, thus greatly reducing the friction between them and permitting the large or driving gear wheel $c^2$ to mesh easily with the very much smaller driven gear wheel $c'$.

The shaft $d$ has secured to its ends the diametrically opposite crank arms $d'$, $d^2$, which are arranged outside of the supporting bracket, the said crank arms and shaft forming a crank shaft. The crank arms are shown as slotted longitudinally, as at $h$, and the crank pins $h'$ and $h^2$ are adjustably secured therein by the set screws $h^\times$, the slots permitting the effective radius of the crank pins to be adjusted according to circumstances.

The mechanism described may be used for a variety of purposes, for transforming reciprocating into rotary motion.

What I claim is—

1. A power transmitting or driving mechanism, comprising the gear wheel $c'$, having the series of teeth $c^4$, the intervening groove $c^3$, and the friction rolls in said groove, and the gear wheel $c^2$ provided with a series of teeth to enter the groove $c^3$ and engage the friction rolls therein, and laterally projecting friction rolls $c^{10}$ engaging the teeth $c^4$, substantially as described.

2. A power transmitting or driving mechanism, comprising the gear wheel $c'$, having the series of parallel teeth $c^4$, and the intervening groove $c^3$ provided with the friction rolls $c^5$, and the gear wheel $c^2$ having the teeth $c^7$, the laterally projecting rolls $c^{10}$, and the roll-retaining flanges $c^8$, substantially as described.

In testimony whereof I have signed my name to this specification in the presence of two subscribing witnesses.

CASIMIR PAUTHONIER.

Witnesses:
   JOHN C. EDWARDS,
   FREDERICK L. EMERY.